United States Patent [19]
Murphy

[11] Patent Number: 5,369,909
[45] Date of Patent: Dec. 6, 1994

[54] APPARATUS FOR KILLING INSECTS ALONG AN ELECTRIC FENCE

[75] Inventor: Stephen P. Murphy, Brewton, Ala.

[73] Assignee: Farris, Harden & Associates, Inc., Birmingham, Ala.

[21] Appl. No.: 150,822

[22] Filed: Nov. 12, 1993

[51] Int. Cl.⁵ .............................................. A01M 1/22
[52] U.S. Cl. ......................................... 43/112; 43/98
[58] Field of Search ...................... 43/98, 112; 256/10

[56] References Cited

U.S. PATENT DOCUMENTS

| | | | |
|---|---|---|---|
| 3,504,892 | 4/1970 | Crist | 43/112 |
| 3,747,897 | 7/1973 | Conley | 43/98 |
| 3,789,537 | 2/1974 | Rule | 43/112 |
| 4,862,637 | 9/1989 | Dressel | 43/98 |

FOREIGN PATENT DOCUMENTS 1604155 12/1981 United Kingdom ................... 43/98

*Primary Examiner*—Kurt C. Rowan
*Attorney, Agent, or Firm*—Veal & Associates

[57] ABSTRACT

A device for drawing current from an electric fence to attract and electrocute insects. The device includes a grounded hollow tubular member with apertures in liquid communication with a source of insect lure. A single or double strand of wire is supported by insulators mounted in parallel along said tube. The wires engage said electric fencing such that insects attract to said tube by the aroma of the lure and are electrocuted by contacting the wires and grounded base.

13 Claims, 5 Drawing Sheets

APPARATUS FOR KILLING INSECTS ALONG AN ELECTRIC FENCE

FIELD OF THE INVENTION

This invention relates to the control of pests and in particular, insects which are found predominately in the barnyard or backyard. In greater particularity, the present invention relates to a control device which draws current from an existing electric fence. More particularly, the present invention utilizes an electrified wire of an existing fence and a grounded base member of the invention to create a voltage potential between two closely spaced conductors such that an insect may be electrocuted by simultaneous contact therewith.

BACKGROUND OF THE INVENTION

Electronic insect control devices are generally known as a means for eliminating insects and other pests near homes and gardens. These devices have large housing structures permanently supported and connected to a source of electrical current. Lights or scented lures are used to attract the insects into contact with electrified structures which electrocutes the insect. Although the above devices are effective in controlling insects, they require a source of alternating electrical current which limits their use to areas where current is available through convenient outlets or by special wiring to remote locations. Such devices are fine for barns and sheds where current is available but often present wiring problems when insect control is needed in remote locations. In particular, it is often impractical to wire many livestock enclosures which are located far from an existing outlet of alternating electric current.

However, farm areas are wired with pulsed direct current in the form of electric fencing which may serve as an enclosure or as a barrier. The livestock in these areas attract a great number of insects, especially flies. An abundance of flies or similar pests can lead to many health related problems for certain forms of livestock., i.e. spread of disease among farm animals. Control of the insect population is necessary to maintain animal health which in turn leads to efficient production by the livestock. What is needed in the livestock industry is a simple and effective electronic insect control device which operates on direct current from electric fencing.

SUMMARY OF THE INVENTION

It is an object of this invention to provide a simple and effective insect control device for use in conjunction with electric fencing.

Another object of this invention is to provide an insect control device for use with electric fencing which operates with direct current.

Still another object of this invention is to provide an insect control device that is quickly and easily detachable and movable along electric fencing.

Yet another object of this invention is to provide an insect control device for use with electrified fencing which effectively attracts insects into an area for electrocution.

These and other objects of the invention are accomplished though far from a home current supply.

BRIEF DESCRIPTION OF THE DRAWINGS

Apparatus embodying features of the present invention are depicted in the accompanying drawings which form a portion of this disclosure and wherein.

DESCRIPTION OF THE PREFERRED EMBODIMENT

Figure 1:
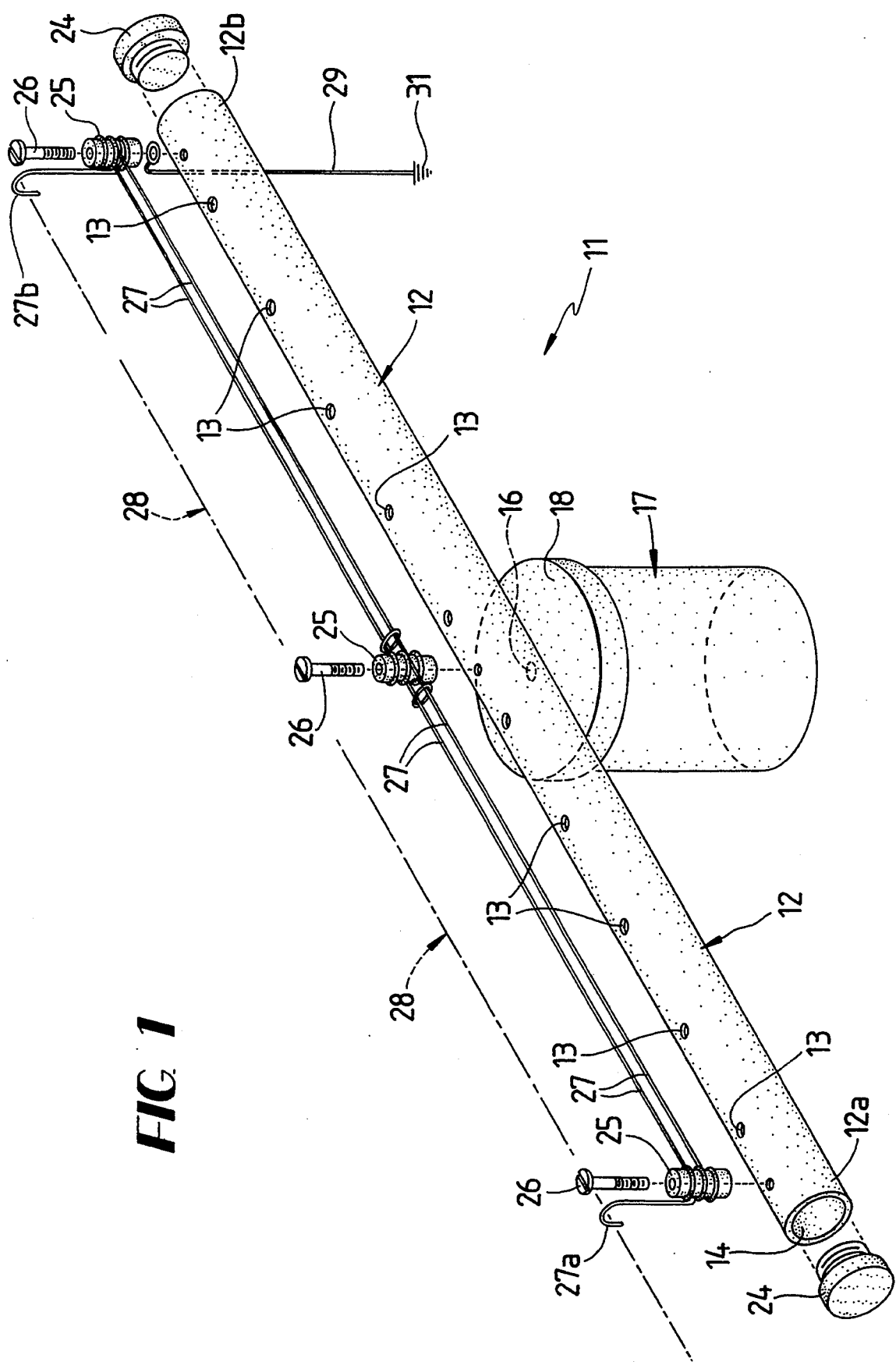
FIG. 1 is an exploded perspective view of the insect control device.
Figure 3:
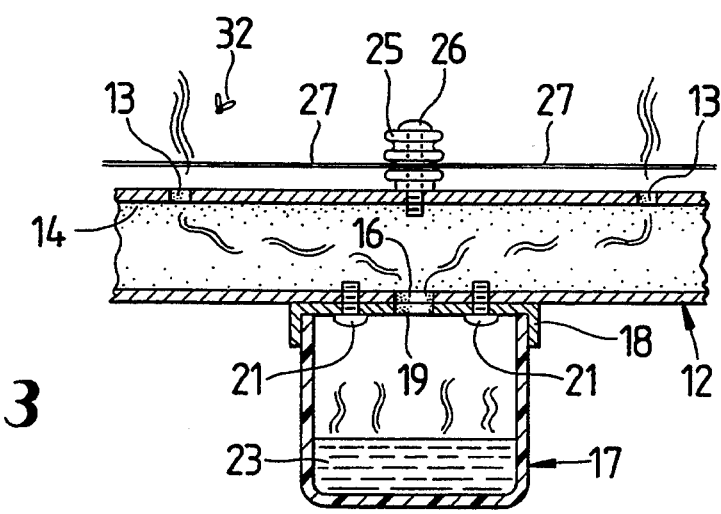
FIG. 3 is a longitudinal, sectional view of the hollow tube member and container of insect attractant.
Figure 4:
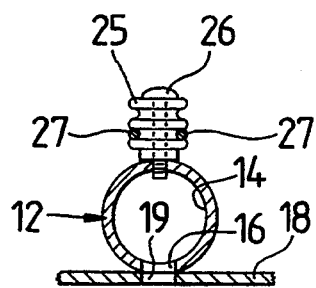
FIG. 4 is a cross sectional view of hollow tube member and container lid.

Referring to the drawings for a clearer understanding of the invention, it may seen in FIG. 1 that an insect control device is indicated generally by reference numeral 11. The device 11 includes an elongated hollow tubular member 12. The tubular member 12 has a plurality of substantially aligned apertures 13 formed along the top of tubular member 12 and providing communication with the interior 14 of tubular member 12. An aperture 16 is formed or defined near the center of tubular member 12 opposite apertures 13. Mounted subjacent to tubular member 12 is a container 17, such as a canister, jar or cylinder. The container 17 has a lid 18 defining an aperture 19 aligned with aperture 16 for communication with the interior 14 of tubular member 12 as is shown in FIG. 3. The lid 18 is held in place by fasteners 21, such as screws, bolts, rivets etc. The container 17 engages and is held in place by lid 18. The container 17 may screw into place or be held by the frictional engagement of lid 18. The container 17 provides a reservoir for an insect lure 23 as seen in FIG. 3. The lure 23 may include a variety of odiferous materials including worms, grubs, animal waste, spoiled grain and decaying flesh. Preferably decaying fish remnants are placed in the container. A set of end caps 24 are inserted into the ends 12a and 12b of hollow tubular member 12 to prevent the aroma from lure 23 from escaping through ends 12a and 12b.

Referring to FIG. 1, a plurality of insulators 25 are mounted to tubular member 12 in alignment with apertures 13. Fasteners 26, such as screws, secure the insulators 25 in an upright position along tubular member 12. Insulators 25 are formed from ceramic or glass for low conductivity of electric current. The insulators 25 support wire(s) 27 above the apertures 13 of tubular member 12. The wire 27 may be a single strand or double strand supported by insulators 25 in parallel as shown in FIG. 1. Ends 27a and 27b of wire are formed into the shape of upstanding hooks at opposite ends of tubular member 12.

Figure 2:
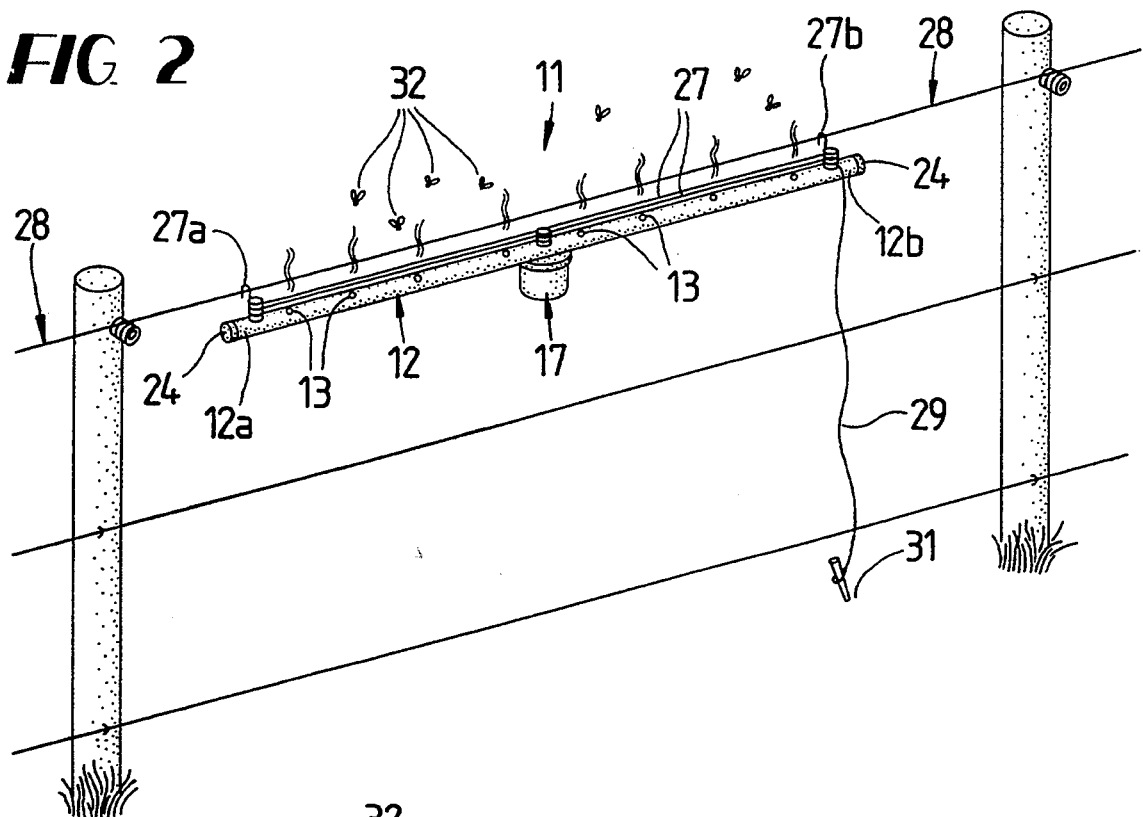
FIG. 2 is a perspective view of the invention suspended from an electric fence.

The hook shaped ends 27a and 27b engage and contact a length of electrified fencing 28 such that the insect control device 11 is suspended beneath fencing 28 as shown in FIG. 2. The tubular member 12 may also engage the electric fencing 28 in a manner wherein the electrified fence 28 acts as electrode wire 27. Thus, the fencing 28 extends through apertures definded by insulators 25 and the tubular member 12 is suspended beneath fencing 28 without the aid of engaging hook shaped ends 27a and 27b. A ground wire 29 contacts an end of tubular member 12 as seen in FIG. 1 and is grounded to the earth 31 as shown in FIG. 2.

In actual operation, direct current from the electrified fencing 28 passes through wires 27. Aromatic communication of the lure 23 through apertures 19, 16, and 13 attracts insects 32 to the tubular member 12 as best seen in FIG. 2. The insects 32 land on the tubular member 12 near the apertures 13 and subsequently comes in contact with wire(s) 27 resulting in fatal electrocution of the insect 32. Other insects 32 are continually attracted to the lure 23 and are destroyed in a similar manner. In fact, remnants of electrified insects act as a supplemental lure.

Figure 5:
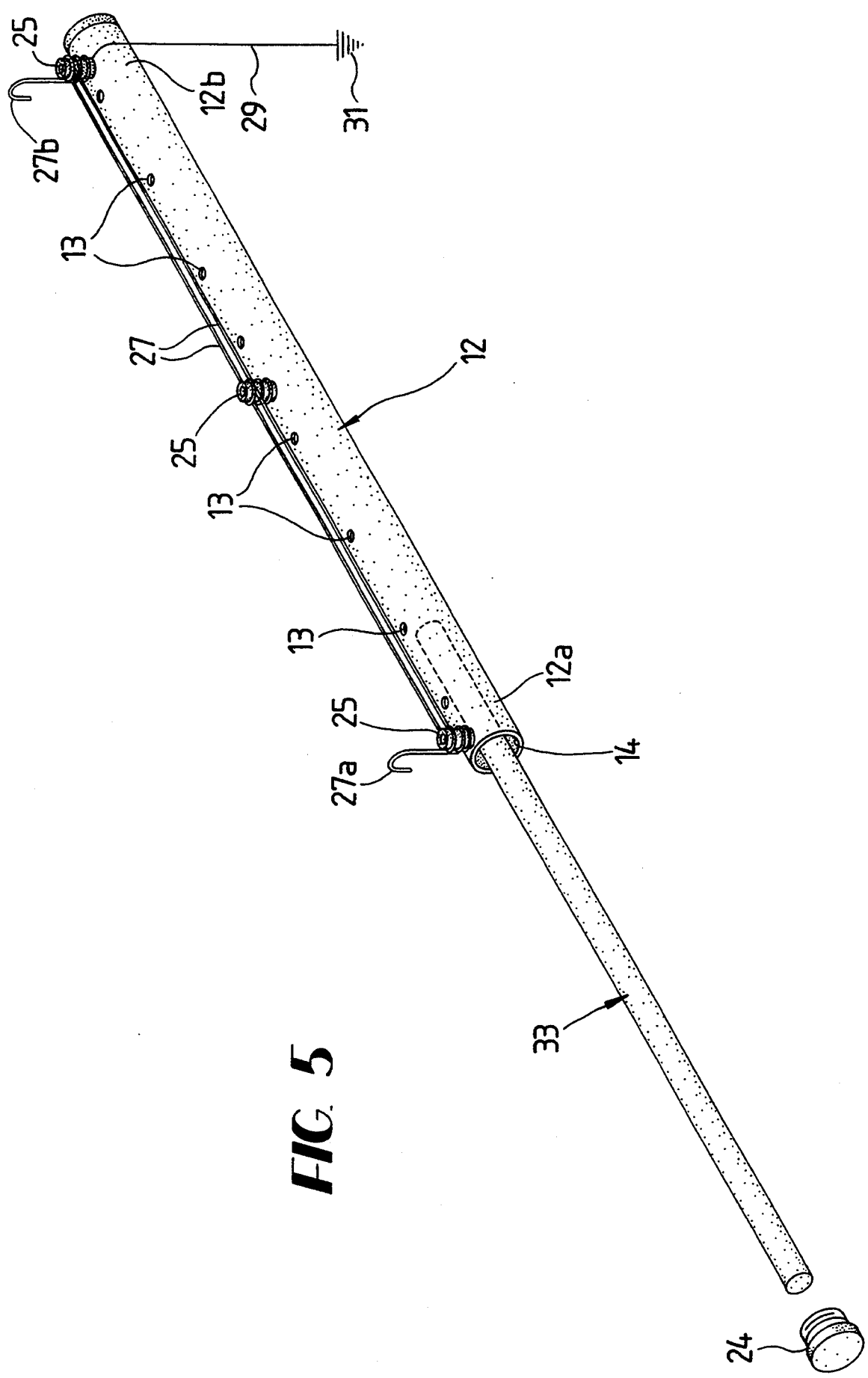
FIG. 5 is a perspective view of an alternative embodiment of the invention which includes a replaceable attractant, cylindrical rod insertable within the hollow tube member.

An alternative embodiment of the insect control device 11 is shown in FIG. 5. In this embodiment, the lure 23 is in the form of cylindrical rod 33 which is insertable within the interior 14 of tubular member 12. The rod 33 is a plastisol base which has an aromatic constituent added thereto, which causes the rod 33 to provide an odor similar to the decaying fish lure, but which can be easily replaced within the tubular member. In this embodiment, the end caps 24 of the tubular member 12 are removable and the separate container is eliminated. The plastisol rod 33 may be sealed in an airtight package, as is well known in the art, so that it remains fresh until inserted into the tubular member. Aromatic communication continues from rod 33 through apertures 13 and the insect control device 11 operates as described hereinabove. The rods 33 of lure 23 may be replaceable and utilize highly developed attractants.

Figure 6:
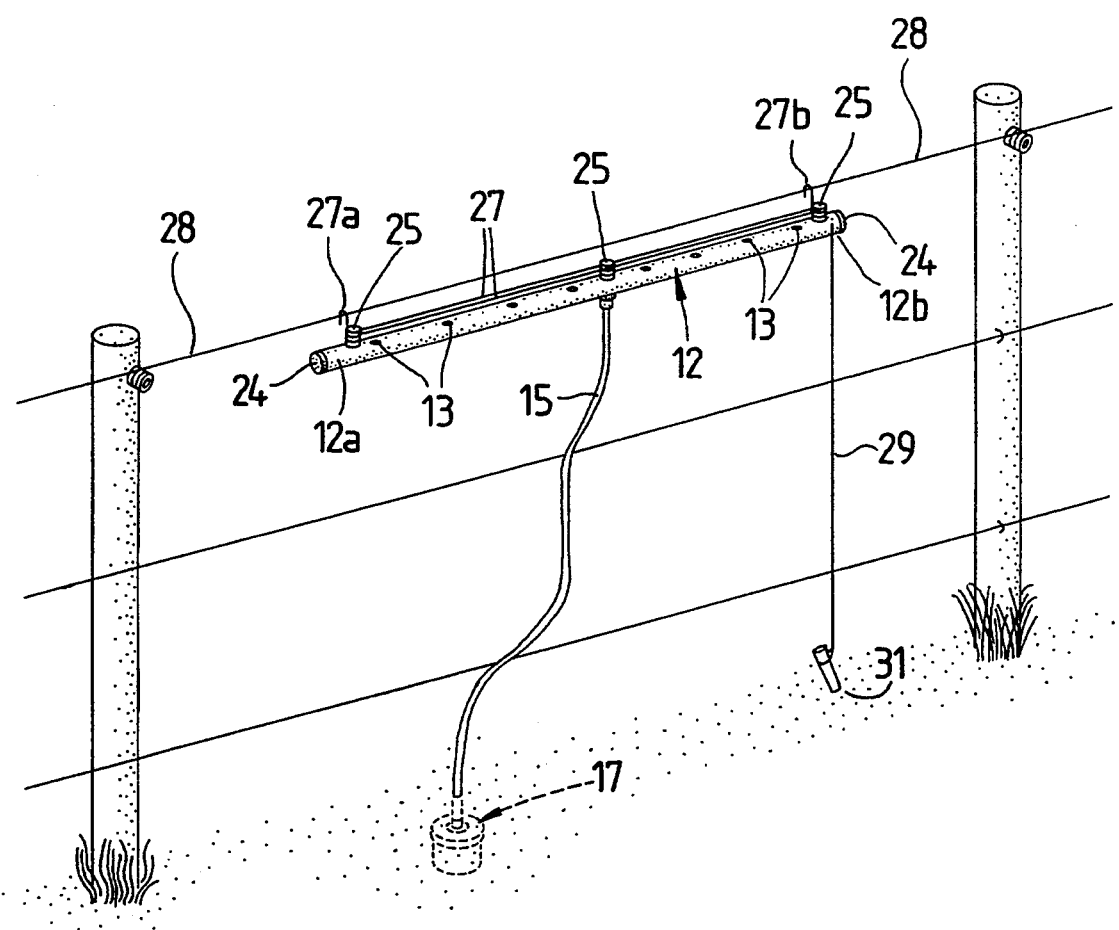
FIG. 6 is a perspective of the invention wherein the container of insect attractant is buried in the ground.

In another embodiment, as shown in FIG. 6, container 17 is buried in the ground near the tubular member 12, to maintain the wire at a relatively constant temperature, and a tubing 15 is connected between the container 17 and the tubular member 12 to facilitate odiferous communication therebetween. The tubular member 12 may be partially painted black or have a rough finish such that it absorbs heat, thereby heating the air inside the tubular member 12 to create convection currents from the container 17.

Figure 7:
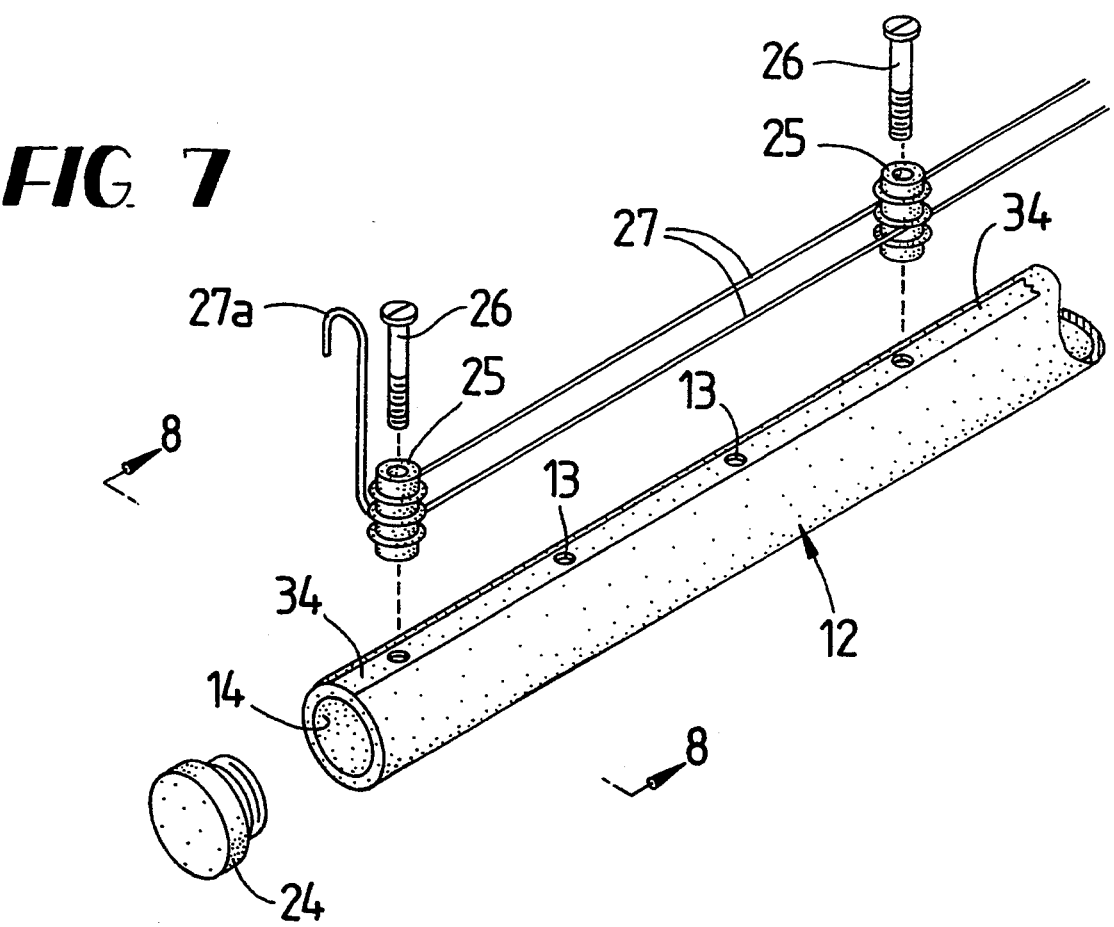
FIG. 7 is a perspective view of the invention wherein a PVC tube is mounted with a metallic strip.
Figure 8:
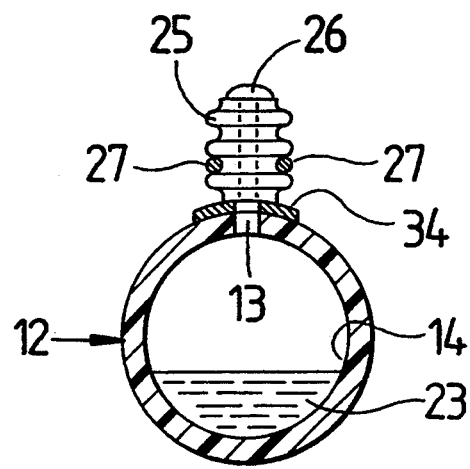
FIG. 8 is a cross sectional view of the invention in FIG. 7.

In still another embodiment, the tubular member 12 is a PVC pipe as shown in FIG. 7. A metallic strip 34 mounts to the top of the tubular member 12 in alignment with apertures 13 defined therein strip 34, which is grounded as described hereinabove. Referring to FIG. 8, a cross sectioned view of the PVC tubular member 12 is shown. Insect lures 23 in liquid or granular form may be placed within the interior 14 of tubular member 12 as shown in FIG. 8.

While I have shown my invention in several forms, it will be obvious to one skilled in the pertinent art that it is not so limited but is susceptible to various changes and modifications without departing from the spirit thereof.

What I claim is:

1. An insect control apparatus for use in conjunction with electrified fencing comprising: .
   (a) a grounded tubular member;
   (b) electrode means contacting said electrified fencing and supporting said tubular member therefrom, said electrode means and said tubular member being held in relative spaced relation; and
   (c) means for attracting insects to said tubular member.

2. An insect control apparatus as defined in claim 1 wherein said electrode means further comprises at least one wire spaced from said tubular member by a plurality of insulators.

3. An insect control apparatus as defined in claim 2 wherein said electrode means forms hangers at opposite ends of said tubular member for engaging said electrified fencing.

4. An insect control apparatus as defined in claim 1 wherein said tubular member having a linear array of apertures defined therein, and, wherein said means for attracting is a container mounted in fluid communication with the interior of said tubular member, said container including an aromatic insect attracting material.

5. An insect control apparatus as defined in claim 4 wherein said means for attracting is a cylindrical rod containing an aromatic insect attractant and insertable within said tubular member.

6. An insect control apparatus as defined in claim 4 wherein said means for attracting is a canister mounted subjacent said tubular member and in fluid communication with the said interior of said tubular member, said canister removable and fillable with insect attracting material.

7. An insect control apparatus for use in conjunction with electric fencing comprising: .
   (a) At least one wire in contact with said electric fencing, said wire extending between a plurality of insulators;
   (b) a substantially horizontal hollow tube, said tube having a series of apertures defined therein, each of said plurality of insulators affixed to said tube such that said wire is maintained proximal said apertures in said hollow tube, said hollow tube having a ground wire attached thereto; and
   (c) a means for attracting insect to said hollow tube.

8. An insect control apparatus as defined in claim 7 wherein said wire forms hangers at opposite ends of said hollow tube such that said hangers contact said electric fencing while suspending said hollow tube and said means for attracting beneath said electrified fencing.

9. An insect control apparatus as defined in claim 7 wherein said means for attracting is a canister having a lid and a body, said lid affixed to said hollow tube and said body detachable from said lid.

10. An insect control apparatus as defined in claim 8 wherein said means for attracting is a container buried within the ground, said container having tubing connecting, said container and said hollow tube.

11. An insect control apparatus for use in conjunction with an electrical source such as provided by electric fencing comprising:
   (a) a substantially horizontal hollow tube defining a plurality of linear apertures on a top surface thereof, a cylindrical rod containing an aromatic attractant, insertable within said hollow tube, a plurality of insulators attached to said hollow tube along said plurality of linear apertures, said insulators engaging and supporting a wire in close proximity above said plurality of linear apertures, said wire forming hook shaped ends at opposite ends of said hollow tubes, said hook shaped ends engaging said electrified fencing for suspending said hollow tube therefrom.

12. An insect control apparatus for use in conjunction with electric fencing comprising a substantially horizontal hollow tube defining a plurality of linear apertures on a top surface thereof, said tube having at least one second aperture on a lower surface thereof, said second aperture coaligned with an exit aperture defined in a detachable canister mounted subjacent said hollow tube, a plurality of insulators attached to said hollow tube aligned with said plurality of first apertures, said insulators engaging and supporting a wire in close proximity above said line of first apertures, said wire forming hook shaped ends at opposite ends of said hollow tubes, said hook shaped ends engaging said electrified fencing for suspending said hollow tube and container therefrom.

13. An insect control apparatus as defined in claim 12 wherein said hollow tube is blackened or roughened to absorb radiant energy to facilitate aromatic communication.

* * * * *